United States Patent [19]

Tymchuck et al.

[11] 4,189,868
[45] Feb. 26, 1980

[54] PACKAGE FOR PERISHABLE PRODUCE

[75] Inventors: Donald L. Tymchuck, Minnetonka; Nelson J. Beall, St. Michael; Noel Davis, Wayzata; William M. Dreier, Minneapolis, all of Minn.

[73] Assignee: General Mills, Inc., Minneapolis, Minn.

[21] Appl. No.: 880,242

[22] Filed: Feb. 22, 1978

[51] Int. Cl.² .................................... B65D 85/52
[52] U.S. Cl. .................................... 47/84; 206/423; 47/58; 47/74; 47/77
[58] Field of Search ............... 47/79, 56, 62, 66, 69, 47/87, 64, 73, 77, DIG. 2; 206/423

[56] References Cited

U.S. PATENT DOCUMENTS

| | | | |
|---|---|---|---|
| 3,320,697 | 5/1967 | Larsen | 47/69 |
| 3,362,106 | 1/1968 | Goldring | 47/79 X |
| 3,872,621 | 3/1975 | Greenbaum | 47/87 |
| 4,034,508 | 7/1977 | Dedolph | 47/84 |
| 4,075,785 | 2/1978 | Jones | 47/64 |

*Primary Examiner*—Robert E. Bagwill
*Attorney, Agent, or Firm*—Gene O. Enockson; L. MeRoy Lillehaugen

[57] ABSTRACT

A package combination for storing and preserving a living plant such as lettuce. A bag, formed of a plastic material, is inflated with a gaseous medium. A living plant having an absorbent block attached to its root system, is placed within the bag in such a manner that the block absorbs moisture which condenses within the bag, and makes it available to the plant.

6 Claims, 4 Drawing Figures

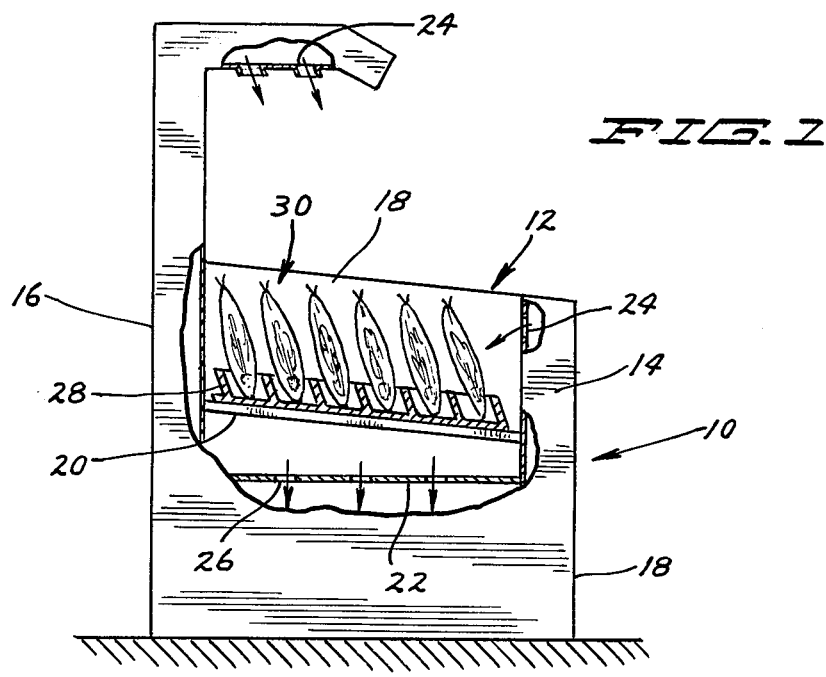
FIG. 1
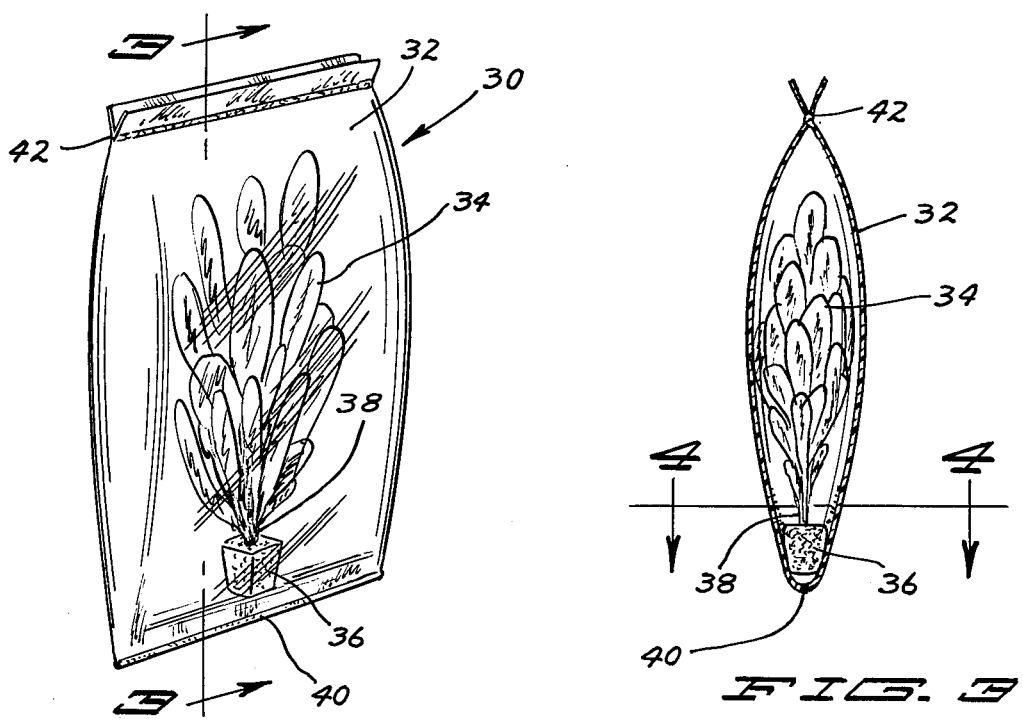
FIG. 2
FIG. 3
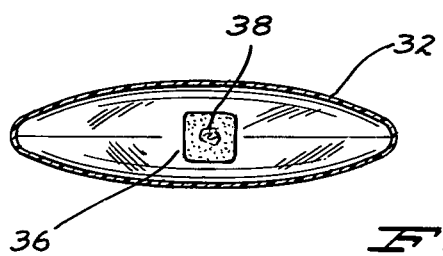
FIG. 4

PACKAGE FOR PERISHABLE PRODUCE

The present invention relates to the packaging of perishable fresh produce, and more specifically, to the packaging of living plants, such as lettuce and other perishable vegetables, flowers, and the like, in a refrigerated environment.

It is well known that a refrigerated environment reduces the level of respiration of produce stored therein. Refrigerated storage receptacles, such as produce display counters, are commonly used for prolonging the shelf like of perishable food products. Vegetables such as lettuce, for example, are ofttimes displayed and stored in a produce counter which is maintained at a predetermined temperature, so as to retard deterioration and spoilage of the produce. Thus, the storage life of the produce can be effectively prolonged by controlling the temperature within the display counter.

Due to the perishable and fragile nature of most fresh vegetables, fruits and other plant materials, many attempts at protecting them by improved packaging techniques have been made. Plastic films are commonly used because they are low in cost and they can maintain and protect the fruit, vegetable, or plant for a certain period of time. Thus, encasing produce in a plastic film, and storing it in a refrigerated environment has improved the shelf life of such produce. Moreover, it has been found that injecting a nontoxic gaseous medium such as oxygen, carbon dioxide, or the like, into an envelope or bag containing the produce, results in improved storage capabilities.

Despite the improvements which have been made in the past in the packaging and storage of produce, it has been found that certain kinds of produce are especially susceptible to deterioration when stored in refrigerated display counters, especially where a temperature differential may exist which affects different parts of the container holding such products. Certain kinds of lettuce, for example, when placed in such a display counter, under what might be considered ideal conditions, still experience a certain degree of degradation and deterioration, due to such temperature differential. U.S. Pat. No. 4,028,847 Davis et al - APPARATUS FOR PRODUCING PLANTS - discloses an apparatus and procedure for growing plants such as Bibb lettuce, Buttercrunch lettuce, Boston lettuce, leaf lettuce, and the like, in a controlled environment. It has been discovered that produce of this type, even when stored in an inflated plastic bag or pouch in a refrigerated produce display counter, will deteriorate and spoil. This is especially true if a temperature differential exists which affects the pouch. For example, if one portion of the pouch rests on a cold surface, such as ice or a cold metal portion of the display counter, while the ambient temperature surrounding the remainder of the pouch is significantly warmer, e.g., at room temperature, the plant material will wilt.

It has been observed that while the plant material in the warm part of the pouch is wilting there is a significant amount of moisture condensing on the cold surface of the pouch. Such a "cold spot wilt" condition is logical since the plant material is 90–95% water and will transpire to maintain an atmosphere of essentially the same relative humidity in the pouch. However, since the cold surface is well below the ambient temperature on the rest of the pouch, it will also be below the dew point of the internal pouch atmosphere, leading to condensation. As moisture condenses on the cold surface, water is given up by the plant material to maintain the high humidity, thereby adding more water to be condensed on the cold surface. Effective pumping action is created moving moisture from the plant to the cold spot on the inner surface of the pouch. Eventually, all the plant material in the pouch will be severly wilted, even though puddles of condensation exist within the pouch.

Accordingly, one object of the present invention is to provide a new and improved packaging technique for perishable food products.

Another object is to provide improved means for packaging perishable products such as vegetables, fruits, plants and the like, in a refrigerated environment.

A further object is to provide improved packaging means for providing a controlled atmosphere around a perishable product to reduce physiological and/or microbiological breakdown of the product tissue.

A still further object is to provide improved packaging means for protecting perishable produce from external toxic gases such as ethylene or carbon monoxide.

Another object is to provide improved packaging means for produce such as lettuce, which provides good product visability and physical protection of such produce.

A further object is to provide improved packaging means for living plants in which moisture loss and plant wilting is minimized.

Other objects and advantages will become apparent from a consideration of the following specification and accompanying drawings. Before proceeding with a detailed description of the invention, however, a brief description of it will be presented.

In general, the invention comprises a pouch or bag formed of a flexible, gas impervious plastic film material, which is capable of being sealed so that it can be inflated with a gaseous medium. A food product, such as a living lettuce plant, is positioned within the pouch with at least a portion of its root system intact. A root supporting block is attached to the root system of the plant; such block being formed of a moisture absorbing and retaining material. Proper positioning of the plant and its attached absorbent block within the pouch, enables such block to absorb moisture which condenses within the pouch, thus prolonging the shelf life of the food product.

The invention will be understood by reference to the following drawings, wherein:

FIG. 1 is a side elevational view, in partial section, of a refrigerated produce display counter for holding a plurality of bags containing produce;

FIG. 2 is a perspective view of the package of the invention;

FIG. 3 is a cross-sectional view taken along line 3—3 of FIG. 2; and

FIG. 4 is a cross-sectional view taken along line 4—4 of FIG. 3.

FIG. 1 illustrates a refrigerated produce display counter 10. Produce display counters of this type are commercially available units, and as such, are well known in the art; accordingly, they will not be described in any great detail. Briefly, the display counter includes a compartment surrounded by four insulated vertical walls, a front wall 14, a rear wall 16, and a pair of end walls 18. An appropriate support grid 20, formed of spaced apart bars, wire mesh, or the like is mounted within the compartment 12 so that it is spaced above the bottom surface 22 of the compartment, and inclined slightly with respect to the surface 22. A plurality of vents 24 are provided for introducing refrigerated air into the compartment. An appropriate blower and cooling coils (not shown), provide the means for introducing refrigerated air into the compartment. A plurality of vents 26 are also provided for removing or drawing air from the bottom of the compartment. A removable compartmented tray 28 is also depicted within the display counter and it is positioned on the grid 20. A plurality of the trays are preferably placed in side-by-side relationship within the compartment 12. It is preferred that the tray 28 be formed of a material other than metal, such as plastic.

FIG. 1 also illustrates a plurality of pillow-shaped packages 30 positioned in the compartmented tray 28. Each package combination 30 includes a bag or pouch 32, a plant structure 34 positioned within the bag, and a support block 36 attached to the root system 38 of the plant. It has been found that a variety of thin, transparent and clear flexible plastic films might be used. Since it is preferred that the bag be inflatable, the plastic film should be substantially gas impervious, as well. Plastics such as polyethylene, polypropylene, polyvinylchloride and/or polystyrene, with or without additives such as, plasticizing agents and/or surfactants, have been found suitable. The film thickness can vary to provide optimum internal/external gas exchange, rigidity, sealability and puncture resistance.

As shown more clearly in FIGS. 2 and 3, the bag 32 is provided with a first hermetically sealed seam 40 at its lower end, and a second hermetically sealed seam 42 proximate its upper end. The seams 40 and 42 prevent a gaseous medium injected into the bag 32, from escaping from the bag.

The plant structure 34 positioned within the bag 32, is a living organism. It has been found that the present invention can be used for prolonging the shelf life of a variety of packaged plants, including a variety of vegetables, as well as a variety of ornamental floriculture products, such as flowers, pot plants and green foliage. For purposes of illustration, the packaging of a plant such as Bibb lettuce which is still living, will be decribed. It should be understood that the packaging technique can be used satisfactorily for packaging other forms of produce, as well. For example, by placing a block or other structure of absorbent material in a bag containing a harvested head of Bibb lettuce, so that it is in contact with any condensate which might collect, such block will absorb the moisture and dissipate at least some of it into the atmosphere within the bag.

U.S. Pat. No. 4,028,847, referred to hereinbefore, discloses hydroponically growing plants such as Bibb lettuce, under controlled conditions. After harvesting such a plant, a time period of several days, or even weeks, may pass before the produce is sold for consumption. Unless proper storage conditions are utilized, the produce will spoil. It has been discovered that packaging a head of Bibb lettuce, which has been harvested, i.e., separated from its root system, in a bag, as set forth above, followed by subsequent storage in a refrigerated environment, such as a large cooler or refrigerator, results in a shelf life which is quite satisfactory. This can be explained because the temperature of the ambient air surrounding the bag, as well as the air within the bag, and the temperature of the produce itself, are all at substantially the same level. When the same produce is placed in a refrigerated display counter, as illustrated, for example, in FIG. 1, problems arise due to a temperature differential which exists within the compartment.

It is well known that plants dissipate moisture through transpiration. The temperature differential which exists in a refrigerated display counter, causes a plant to give off moisture through transpiration, into the surrounding atmosphere, at an increased and unsatisfactory rate. If packaged within a bag as described above, this transpiration phenomena will continue until the relative humidity of the air within the bag is in equilibrium with the moisture within the plant. If however, a cold spot occurs on a portion of the bag, caused for example, by blowing cool air onto a portion of the bag, or perhaps by placing the bag on a surface having a lower temperature than the temperature within the bag, moisture condenses within the bag, at that location and the relative humidity within the bag goes down. The plant transpires an additional amount to compensate for the drop in relative humidity within the bag. In other words, an effective pumping action is created which moves moisture from the plant to the cold spot on the inner surface of the bag. Eventually, the plant gives off so much moisture, that it wilts and finally dies, even though puddles of condensation exist within the bag.

The present invention effectively overcomes the problems discussed above. By maintaining the plant's root system in a support block formed of a moisture absorbing and retaining material, the plant can be permitted to absorb moisture which might condense within the bag, thus compensating for moisture given off by the plant by transpiration.

It has been found that support blocks serve a number purposes. They hold the plant seeds, they provide a support for the plants as they grow, and they provide moisture to the seeds and plants. The blocks should be capable of absorbing moisture and the plant's roots should be able to penetrate into the blocks. Compressed fibrous blocks formed from inexpensive waste products of wood and/or paper, peat, sphagnum moss, or the like, work quite satisfactorily. Blocks formed from other types of material have been found to work satisfactorily, as well; such materials include natural and synthetic sponge material, polyurethane foam, cellulose, and the like.

As shown in the drawings, the bag 32 is oriented so that it is maintained in a somewhat vertical position. The plant is positioned within the bag 32 so that its root system 38 and support block 36 are disposed in the lower portion of the bag. By vertically orienting the bag, any moisture which condenses on the inner surface of the bag will collect at the bottom of the bag. By positioning the support block 36 in this area, it will absorb the condensate, and make it available to the plant.

Any known technique can be used for packaging the plant 34 within the bag. As an example, commercially available pillow-shaped plastic bags having one end hermetically sealed as at 40, were acquired. Air was introduced into the bag through the open end, from an appropriate source; thus causing the bag to be dilated. A plant 34 having a support block 36 attached to its root system 38, was then inserted into the bag so that the support block was positioned proximate the seam 40. The open end of the bag was then hermetically sealed to form the seam 42, while air was being introduced into the bag. Thus, a quantity of air was trapped within the sealed bag.

The entrapped air serves a number of purposes including promoting plant shelf-life and freshness. Perhaps even more importantly, it protects the enclosed plant from damage caused by crushing. The foliage of lettuce plants, as well as most vegetables, flowers, etc., are easily damaged if subjected to rough handling. When inflated, the body wall of the plastic bag is stretched relatively taut, so that the bag is somewhat self-supporting. This offers physical protection to the plant enclosed within the bag and makes it possible to handle the bag without damage to the plant. Thus, by maintaining a volume of a gaseous medium within the bag, the plant is effectively protected. Moreover, in some instances it might be desirable to print material on the bag's outer surface; a more attractive package is presented by inflating the bag.

It should be pointed out that in some instances, it might be desirable to inflate the bag with a gas other than air, such as oxygen, carbon dioxide, nitrogen, or some other nontoxic gas. The use of a plastic bag, as described, permits the use of a variety of gases.

In order to better understand the advantages of the present invention, it is believed that a hypothetical example will illustrate the technical advance which has been made. After the produce has been packaged as described above, it is preferably displayed in a refrigerated produce display counter in a store, so that the produce can be readily viewed and purchased. While a refrigerated display counter as shown in the drawings, does provide a convenient and attractive arrangement for exhibiting the produce, it does present some problems due to the temperature differential which exists in such receptacles.

For purposes of illustration, refrigerated air is introduced through the vents 24 into the display counter 10 at a temperature of approximately 40° F. The ambient temperature of the air surrounding the bags, however, might be as high as 50° F. Eventually, the temperature of the air within the bag 32 will approximate the temperature of the ambient air, i.e., 50° F. The relative humidity of the air within the bag will be very high, perhaps as high 98–100% due to the ability of the plant to give off moisture by transpiration. When the relative humidity of the air reaches an equilibrium point with the moisture content of the plant, very little, if any, transpiration occurs. If, however, moisture condenses within the bag, the relative humidity of the air will drop. At this point, the plant will again transpire; eventually, the available moisture within the plant will be given off and the plant will wilt and die.

Condensation occurs, for example, if a portion of the bag comes in contact with a metal portion of the receptacle 10, which is at a lower temperature than the air. This can be minimized by using trays 28. Moreover, if the refrigerated air is directed onto the bag for a sufficient period of time, a cold spot will result on the bag's surface, which is at a lower temperature than the air within the bag. This, too will result in condensate being formed within the bag.

By orienting the plant 34 within the bag so that the support block 36 is in proximity to the condensate which collects, such condensate can be absorbed and reused by the plant to compensate for the moisture lost by transpiration. It has been found that by vertically orienting the bags 32, as illustrated, the condensate tends to collect at the bottom of the bag. By positioning the support block in this area, the block will absorb such condensate and make it available to the plant. Prolonged shelf life of the produce is accordingly achieved.

It should be realized, of course, that the relative orientation of a plant within a bag might vary, as well as the specific manner in which the condensate is made available for absorption by the support block.

In the above description and attached drawings, a disclosure of the principles of the invention is presented, together with some of the specific embodiments by which the invention might be carried out.

The embodiments of the invention in which an exclusive property or privilege is claimed are defined as follows:

1. In combination, comprising a completely enclosed and sealed bag formed of a flexible, substantially gas impervious plastic film material, said bag having front and back side walls which are spaced relatively far apart intermediate the length thereof and converging downwardly to form a relatively narrow bottom portion and converging upwardly to form a relatively narrow top portion, produce enclosed within said bag and occupying a substantial portion of the bag's interior in a vertical direction, absorbent means within said bag in which said produce has been grown from seed, said absorbent means being positioned within the confines of said relatively narrow bottom portion whereby at least some of any moisture that has collected at said relatively narrow bottom is absorbed by said absorbent means and reused by the produce to compensate for the moisture lost by transpiration and at least an upper portion of said produce being positioned between said upwardly converging side walls, and means for storing and preserving said bag and produce in a refrigerated environment in which a temperature differential is apt to exist on the surface of the bag.

2. The combination of claim 1 in which said block of material is formed from a compressed fibrous material.

3. The combination of claim 1 in which said block of material is formed from a natural sponge material, synthetic sponge material, polyurethane foam, or cellulose.

4. The combination of claim 1 in which the produce is lettuce.

5. The combination of claim 1 in which said bag is inflated with sufficient gas to protect the plant structure from damage caused by the application of an external force against the bag.

6. A method of preserving perishable fresh produce comprising the steps of growing a leaf plant from seed in a block capable of absorbing moisture while said plant is maturing, placing a single block and the plant grown therein in an elongated plastic bag having relatively narrow ends, the sides of said bag tapering to form said relatively narrow ends, with said block and the plant's roots resulting from the earlier growth thereof disposed within the confines of one of said relatively narrow ends of said bag, hermetically sealing the other end of said bag with both said plant and block contained therein and with said block within the confines of said one relatively narrow end, the portion of said bag midway between said ends being relatively wide and the size of said plant being sufficient to substantially fill the bag's interior in a vertical direction so that the plant's leaves reside between the sides of the bag which taper toward said other end of the bag, and storing said bag in a refrigerated environment with said one relatively narrow end of said bag having said block therein lowermost so that said relatively narrow end of said bag constitutes the bag's bottom, whereby condensate formed on the interior of said bag flows downwardly to the bottom of the bag for repeated absorption of such condensate by said block during the storage thereof in said refrigerated environment for reuse by said plant.

* * * * *